(12) United States Patent
McGovern et al.

(10) Patent No.: US 6,966,737 B2
(45) Date of Patent: Nov. 22, 2005

(54) DECK SCREWS SUITABLE FOR USE WITH COMPOSITE LUMBER

(75) Inventors: Hugh McGovern, Westfield, MA (US); Tom Druschel, Florence, MA (US)

(73) Assignee: Olympic Manufacturing Group, Inc., Agawam, MA (US)

( * ) Notice: Subject to any disclaimer, the term of this patent is extended or adjusted under 35 U.S.C. 154(b) by 0 days.

(21) Appl. No.: 09/923,288

(22) Filed: Aug. 6, 2001

(65) Prior Publication Data

US 2003/0026675 A1 Feb. 6, 2003

(51) Int. Cl.[7] ............................................. F16B 35/04
(52) U.S. Cl. ........................ 411/413; 411/414; 411/399
(58) Field of Search ............................. 411/386–387.3, 411/399, 187, 388, 411–413, 403, 424, 426, 411/414

(56) References Cited

U.S. PATENT DOCUMENTS

| | | | | |
|---|---|---|---|---|
| 4,959,938 A | * | 10/1990 | De Caro | 52/410 |
| 5,020,954 A | * | 6/1991 | Dreger | 411/403 |
| 5,863,167 A | * | 1/1999 | Kaneko | 411/426 |
| 6,000,892 A | * | 12/1999 | Takasaki | 411/413 |
| 6,045,312 A | * | 4/2000 | Hsing | 411/412 |

FOREIGN PATENT DOCUMENTS

| | | |
|---|---|---|
| FR | 2 713 291 A | 6/1995 |
| WO | WO 01/06135 A | 1/2001 |

OTHER PUBLICATIONS

"Grip-LokTM Dual Thread Differential Pitch Screw", Packaging Label, Jun. 23, 1999, USA.

Olympic Manufacturing Group, INC., "Rodenhouse Grip Lock As Sold", Jan. 8, 2004, OMG drawing.

Rodenhouse INC., "Rodenhouse Products for EIFS", Walls & Ceilings, Jun. 1999, Tuttle, Troy, MI 48084.

Rodenhouse INC., "Grip-Lok® 3" dia. PB Washers, Jan. 6, 2004, http://www.rodenhouse-inc.com/GripLokx.html, USA.

* cited by examiner

Primary Examiner—William L. Miller
(74) Attorney, Agent, or Firm—Alix, Yale & Ristas, LLP

(57) ABSTRACT

The present invention is directed to a deck screw intended for use with composite lumber, although it can be used with other wood products, such as pressure treated lumber. The deck screw of the present invention may be provided with a head and a shaft that has two regions of varying diameter. The upper region has threads that exceed the number of threads of the lower shaft, on a unit length basis. The threads of the upper shaft may be configured in an inverted buttress design. The lower region of the shaft terminates at a tapered distal end having a pointed tip that leads the screw through the wood material. Threads are provided on the lower region of the shaft. The head of the screw is provided with an upper surface, a lower surface, and a crown that extends around the perimeter of the head, The crown extends beyond the lower surface of the head, forming a recessed region between the lower edge of the crown and the shaft of the screw. The head may also be provided with an undercut. Further, the head of the screw may be provided with a square driver opening that permits the persons installing the screw to use a square bit. For instance the opening may be a #2 square driver opening. It should be understood that Phillips heads or flat heads in various sizes might also be employed.

45 Claims, 3 Drawing Sheets

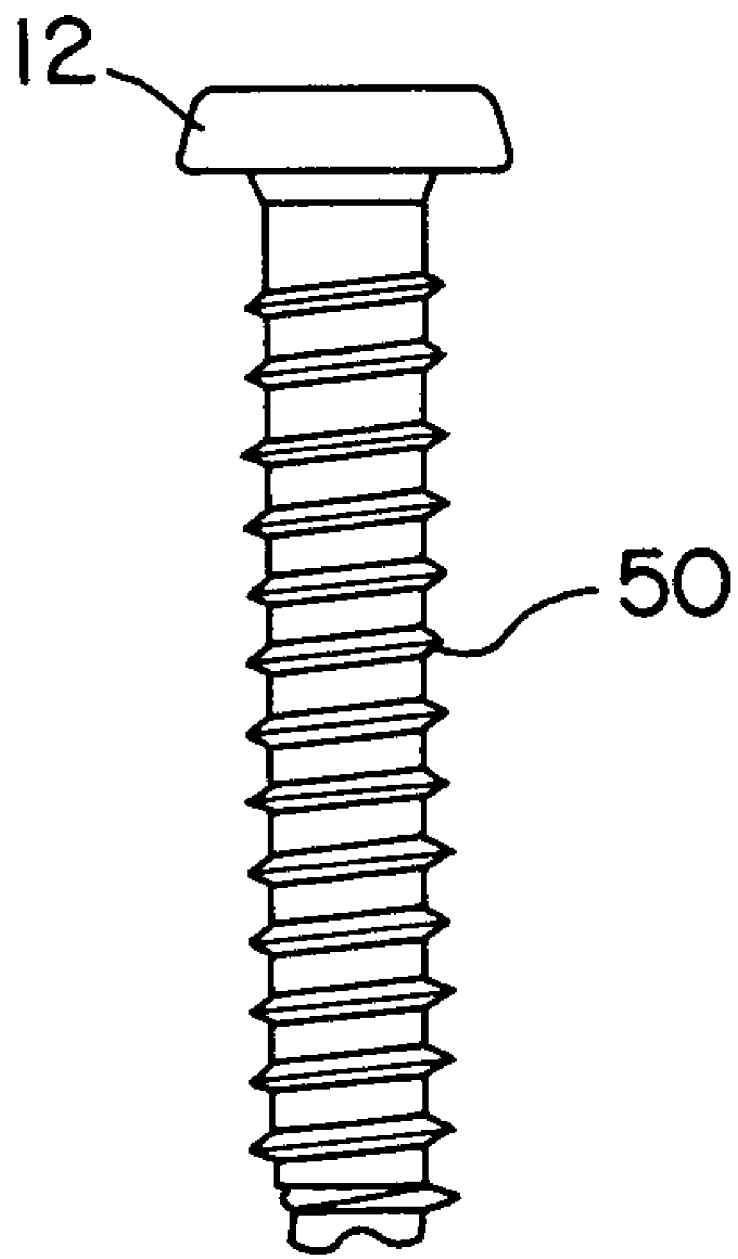
FIG. IA

DECK SCREWS SUITABLE FOR USE WITH COMPOSITE LUMBER

FIELD OF THE INVENTION

The present invention is directed to screws suitable for use in securing lumber, such as deck boards, in the construction of a deck. Notably, the screws are suitable for use with composite lumber.

BACKGROUND OF THE INVENTION

Having a deck associated with a residence or a commercial building, such as a bar or restaurant is highly desirable since it provides a place for outdoor gatherings. The presence of a deck enhances the value of the real estate of the residence or building. People have a natural preference for the outdoors when the weather is nice, whether one is having a backyard barbeque or relaxing with friends and neighbors. Restaurant patrons typically request outdoor seating on nice days and evenings, and often will wait for a table to become available, even though they could be seated indoors immediately.

Typically, the structural members of a deck are made from pressure-treated yellow pine. Pressure-treated wood is preferred for the structure of a deck because of its reasonable cost and high resistance to insect and moisture damage. However, deck surfaces made of pressure treated yellow pine tend to check, split, cup, twist and splinter after prolonged exposure to the elements. In addition, yellow pine is a relatively soft wood and is subject to wear, particularly in high-traffic areas of a deck. Thus, every few years the property owner is confronted with the considerable expense of both money and labor in having to replace deck boards.

In response to the deficiencies of pressure treated yellow pine decking, many homeowners and contractors are now specifying alternative materials for decking, such as redwood, cedar, manmade composite materials or tropical hardwoods. Recently, composite lumber has been introduced as a candidate for deck board materials. Composite lumber is an attractive material choice for deck boards because it is substantially rot-free. Composite lumber is constructed of plastic and wood materials, such as blends of scrap and/or scrap materials. The materials used include, but are not limited to: plastic bags, plastic jugs (such as those used for milk and water), plastic scraps, wood materials such as sawdust and ground-up wood scraps. Higher quality composite lumber may be constructed of virgin plastics such as polyethylene, polypropylene, and ground-up wood scraps. Higher quality composites may offer a more genuine wood-like appearance when compared to lesser grades. Composite wood decking products are available from Fiberon Composites of New London N.C., and the Trex Corporation of Winchester VA, to name just two possible vendors.

Composite lumber products are environmentally sound because they may contain a significant amount of recycled plastic. Composite lumber does not split, check or splinter, making a safe splinter free surface for bare feet and children. However, composite lumber is significantly more expensive than standard pressure treated yellow pine decking. A quality installation is essential to preserve the significant investment in material.

Plastic lumber is available in standard lumber dimensions (5/4 and 2x) as well as custom configurations. Plastic lumber can be cut, shaped and installed using standard tools and fasteners. Decking, railings and banisters are popular applications for composite lumber. Joists used to support plastic decking are frequently required to be closer together than the 16 or 24 inches required for 5/4 and 2x wood decking, respectively. More joists make for a more expensive installation having more screws joining the decking to the structure.

The problem with using composite lumber is that conventional deck screws, when drilled into the lumber, create a mound or bump in the vicinity of the screw. Formation of these mounds or bumps is referred to as "volcanoing" or "mushrooming".

"Volcanoing" is an apt description because the screw sits inside the material that has been raised around the perimeter, and therefore resembles a volcano. It is caused by the action of the screw displacing the composite material as it is driven into the composite material, forcing the material upward. This effect is depicted in FIG. 6, which shows a prior art screw driven into the plastic, and the volcano 51 that surrounds the screw.

To provide the proper finished appearance, the volcano must be hammered or punched back into the board by use of the appropriate tool. While this sometimes is effective, in other instances the appearance of the hammered-down material is not attractive. Also, inadvertently striking the deck surface with a hammer may leave the impression of a hammer head on the deck. Using a punch to do the job eliminates the hammer mark problem, but like using a hammer, it is labor intensive.

Because decks using plastic decking require more floor joists, there are a greater number of screws to install. Even a modest deck requires hundreds of deck screws, making each additional step very expensive in terms of added labor.

Another possible solution to the problem is to pre-drill the screw hole and then insert the screw, but again this is labor intensive and time consuming.

SUMMARY OF THE INVENTION

The present invention is directed to a deck screw intended for use with composite lumber, although it can be used with other wood products, such as pressure treated lumber. The deck screw of the present invention is provided with a head and a shaft. In one embodiment, the shaft has two regions of varying cross sectional area in which the upper region, that is, the region closest to the head of the screw, has a cross sectional area that is greater than the cross sectional area of the lower region. In another embodiment, the upper region and lower region have distinct thread patterns in which the number of threads per unit length in the upper region is greater than the number of threads per unit length in the lower region. In another embodiment, the upper region has threads configured in an inverted buttress design in which the slope of the threads closer to the head is greater than the slope of upper region threads located further down the shaft.

The lower region of the shaft terminates at a tapered distal end having a pointed tip that leads the screw through the wood material. Threads are provided on the lower region of the shaft. The threads may extend to the tip, which can be a gimlet tip, or alternatively, another tip configuration, such as a 17 point tip, may be employed.

The head of the screw is provided with an upper surface, a lower surface, and a crown that extends around the perimeter of the head. The crown extends beyond the lower surface of the head, forming a recessed region between the lower edge of the crown and the shaft of the screw. The crown may be a circumferential undercut extending down from the top surface of the screw head by a skirt extending parallel to the axis of the screw. Converging conical surfaces define a v-shaped undercut that connects the periphery of the screw head to the shaft of the screw.

Further, the head of the screw may be provided with a square driver opening that permits the persons installing the screw to use a square bit. For instance the opening may be a #2 square drive socket opening. It should be understood that Phillips heads or flat heads in various sizes might also be employed.

During installation of the screw in a board of composite lumber, it is believed that the inverted buttress thread located on the upper region of the screw causes the lumber material displaced by the lower region of the screw to be moved back down into the hole. Furthermore, should any lumber material evade this action, the lumber material will be captured within the recessed area of the head. It is believed that one or both of theses features will reduce, if not eliminate, instances of volcanoing or mushrooming.

BRIEF DESCRIPTION OF THE DRAWINGS

FIG. 1A is a side elevational view of an upper portion of an embodiment of the present invention.

DETAILED DESCRIPTION OF THE PREFERRED EMBODIMENT

Figure 1:
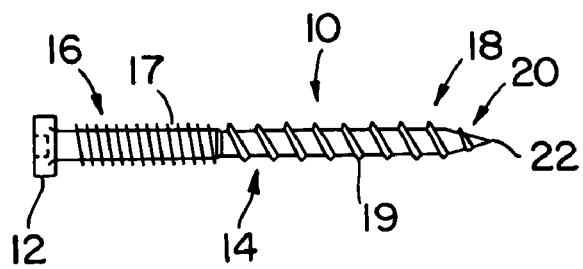
FIG. 1 is a side elevational view of an embodiment of the present invention.
Figure 2:
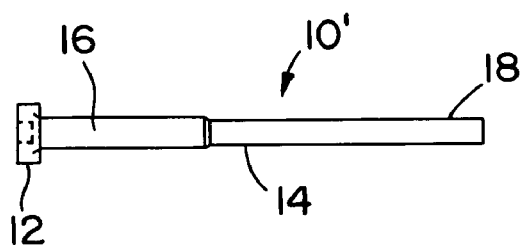
FIG. 2 is a side elevational view of a screw blank used to make screws in accordance with the present invention.
Figure 2A:
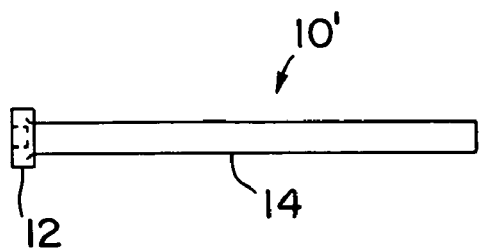
FIG. 2A is a side elevational view of another screw blank used to make screws in accordance with the present invention.

FIG. 1 shows a deck screw 10 of the present invention. As seen in the Figure, the deck screw is provided with a head 12 and shaft 14. FIG. 2 shows screw blank 10', from which the deck screw 10 can be manufactured. The shaft 14 is provided with an upper region 16 that is closest to the head 12, and a lower region 18, closest to the tapered distal end 20 where the screw tip 22 is located. The cross sectional area of the upper region 16 is greater than the cross sectional area of the lower region, as seen in FIG. 2. FIG. 2A shows an embodiment where the cross sectional area of the upper and lower regions are substantially the same.

Tip 22 is provided with a sharp point to allow it to bore through the material. The tip may be a sharp gimlet tip such as one exhibiting a 20° to 30° included angle. The lower region 18 is provided with threads 19 such as ones arrayed in a continuous helical thread that starts near or at the tip 22, proceeds over the tapered distal end 20, and over the lower region 18 to a location near the junction of the lower region 18 and the upper region 16. Thread 19 may have a major diameter 21 of 0.185–0.195 inches and a minor diameter of 0.120–0.130 inches, although the skilled artisan would understand that other possibilities are available. A suitable thread can be a #9—9 thread with a 24°/24° thread pitch. However, other thread configurations are possible, such as other symmetrical arrangements or arrangements in which the thread pitch at the top is shallower than the pitch at the bottom.

The threads 17 of the upper region are configured so that there are a greater number of threads per unit length in the upper region than there are threads per unit length in the lower region. For example, there may be twice the number of threads in the upper region than there are threads in the lower region. In another embodiment, the threads have an inverted buttress configuration 50 as shown in FIG. 1A. That is, the threads are arranged so that the thread pitch is greater at the upper end of the upper region when compared to the thread pitch at the lower end of the upper region. The applicants have found that a thread pitch of 25°/10° (i.e., 25° at the upper end and 10° (i.e., 25° at the upper end and 10° at the lower end) is a suitable thread pitch, although the skilled artisan may recognize that other thread pitches are also suited. Threads 17 may have a major diameter 23 of 0.205–0.210 inches and a minor diameter of 0.138–0.141 inches, although the skilled artisan would understand that other possibilities are available. The applicants have found that a #12–#18 thread arrangement is suitable for this region.

Figure 3:
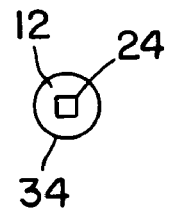
FIG. 3 is an end view of an embodiment of the present application.

FIG. 3 shows the topside of the head 12 of the deck screw 10. The head 12 is provided with an opening 24 in head 12 for receiving a tool, such as a drill bit or screwdriver, which can be used to drive the screw into the wood. In the embodiment shown in FIGS. 3 and 4, the head is provided with a #2 sized square socket opening 24' that opens into a relatively deep cavity 26 for receiving the tool. It is believed that the relatively thicker upper shaft region of the screw allows the screw head to have a relatively deeper opening. Also, an opening such as a #2 square socket opening covers a greater cross sectional area than the size of the opening covered by a Phillips head opening or a flat head opening. As a result, the tool heads used in conjunction with these screws are larger than typical tools or bits in either Phillips head or flat head configurations. A larger bit or driver, such as one embodied in a #2 square bit, may prove to be more durable, and hence, allow the installer to get a longer life out of the installation tool than what would be possible if a Phillips head tool or flat head tool were employed for the job.

Figure 4:
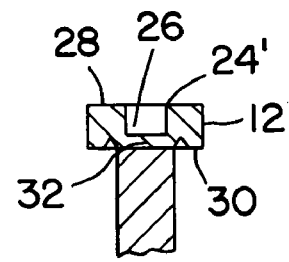
FIG. 4 is a cross sectional view of the screw head of the present invention.

FIG. 4 shows a cross sectional view of the screw head of the present invention. As can be seen in the Figure, the head 12 has a top surface 28, a lower surface 30, and a crown 32 that extends around the perimeter 34 of the head. The crown 32 extends beyond the lower surface 30 of the head 12, forming a recessed region between the lower edge of the crown and the shaft of the screw. The recessed region is a region of open volume located between the outer edge of the crown 32 and the upper shaft 16.

Figure 5:
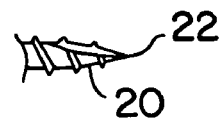
FIG. 5 is a perspective view of a screw tip suited for use on the deck screw of the present invention.

FIG. 5 shows an alternative screw tip in which the tapered distal region has a type 17 point tip in which the threads are interrupted for a couple of turns.

Figure 6:
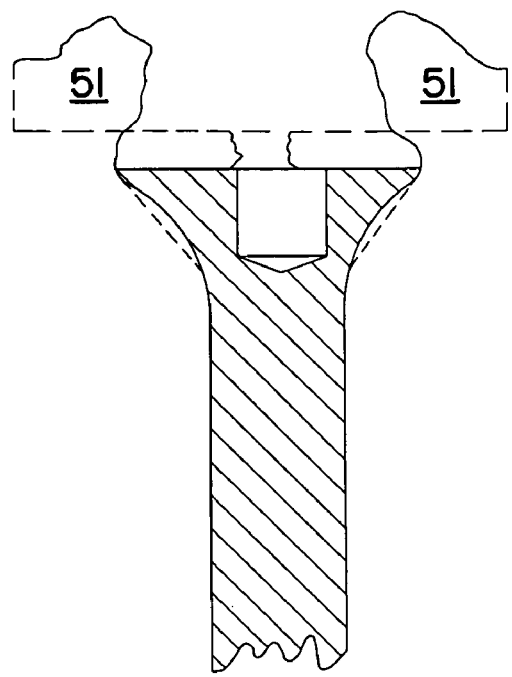
FIG. 6 shows the volcano effect that occurs when a prior art screw is installed in composite lumber.
Figure 7:
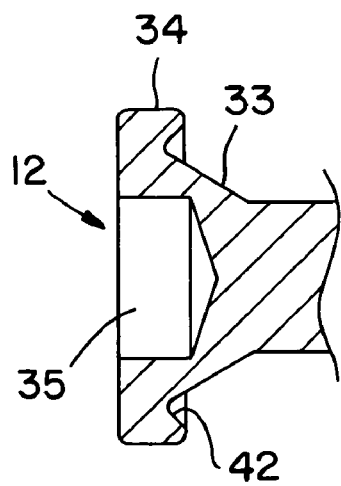
FIGS. 7 and 8 show perspective views of another screw head configuration that can be used in the present invention.
Figure 8:
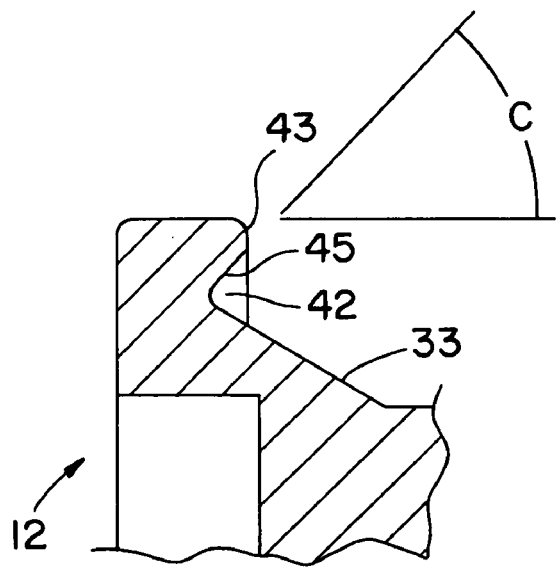

FIGS. 6 and 7 show a further embodiment of the screw head 12 which includes a v-shaped circumferential undercut 42 surrounded by a peripheral lip 43. A conical surface 45 in the undercut 42 connects the lip 43 with the conical underside 33 of the head 12. The conical surface 45 slants away from the lip 43 toward the axis of the screw at an angle of approximately 45°.

The screws may be manufactured from extruded blanks, such as the blanks shown in FIG. 2. Using extruded blanks allows for varying the diameter of the upper and lower parts of the shaft as discussed above. However, the skilled artisan would appreciate that extrusion is not the only way to manufacture the blanks.

The screws can be made of carbon steel or any other suitable material used in making wood screws. The screws may be coated with a zinc plating and a coating of a top coat that matches the color of the composite lumber in which the screws will be installed.

During installation of the screw 10 in a board of composite lumber, it is believed that the inverted buttress thread 17 located on the upper region 16 of the screw 10 causes the lumber material displaced by the lower region of the screw to be moved back down into the hole. Furthermore, should any lumber material escape being moved back down into the hole by the inverted buttress threads, the lumber material will be captured within the recessed area of the head. It is believed that one or both of theses features will reduce, if not eliminate, instances of volcanoing or mushrooming, and the screw will not have to be hammered down. Further, the screw head will sit neatly on the surface, yielding an acceptable installation.

While this invention has been described in relation to composite lumber, it should be understood that this invention has application to securing wood products in general and its principles can be extended to other construction materials.

While an embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A screw for securing wood products, comprised of:
   a shaft and a head, wherein the head is provided with a top surface having an opening to receive a tool and a bottom surface having a v-shaped undercut having a conical surface in the undercut that connects the lip with a conical underside of the head;
   wherein the shaft is provided with a substantially cylindrical threaded upper region located proximate the head and a substantially cylindrical threaded lower region located near a distal end of the screw, the distal end having a tip, and the number of threads per unit length in the upper region exceeds the number of threads per unit length in the lower region, said shaft having a cross-sectional area along the cylindrical upper region greater than the cross-sectional area of the shaft along the cylindrical lower region.

2. The screw of claim 1 wherein the conical surface slants away from the lip toward the axis of the shaft at an angle of approximately 45°.

3. A screw for securing wood products, comprised of:
   a shaft and a head, wherein the head is provided with a top surface having an opening to receive a tool;
   wherein the shaft is provided with a substantially cylindrical threaded upper region located proximate the head and a substantially cylindrical threaded lower region located near a distal end of the screw, the distal end having a gimlet tip having an included angle from about 20° to about 30°, and the number of threads per unit length in the upper region exceeds the number of Threads per unit length in the lower region, said shaft having a cross-sectional area along the cylindrical upper region greater than the cross-sectional area of the shaft along the cylindrical lower region.

4. A screw for securing wood products, comprised of:
   a shaft and a head, wherein the head is provided with a top surface having an opening to receive a tool;
   wherein the shaft is provided with a substantially cylindrical threaded upper region located proximate the head and a substantially cylindrical threaded lower region located near a distal end of the screw, the distal end having a tip, wherein there are at least twice as many threads per unit length in the upper region as there are threads per unit length in the lower region, said shaft having a cross-sectional area along the cylindrical upper region greater than the cross-sectional area of the shaft along the cylindrical lower region.

5. The screw of claim 4 wherein the head is provided with a bottom surface, a crown that extends around the perimeter of the head and extends beyond the lower surface of the head thereby defining an open volume between the lower edge of the crown and the shaft of the screw.

6. The screw of claim 4 wherein the head is provided with a bottom surface, a crown that extends around the perimeter of the head, wherein the crown extends beyond the lower surface of the head, forming a recessed region between the lower edge of the crown and the shaft of the screw.

7. The screw of claim 4 wherein the head is provided with a bottom surface having a v-shaped undercut.

8. The screw of claim 4 wherein the head is provided with a bottom surface having a v-shaped undercut having a conical surface in the undercut that connects the lip with a conical underside of the head.

9. The screw of claim 8 wherein the conical surface slants away from the lip toward the axis of the shaft at an angle of approximately 45°.

10. The screw of claim 4 wherein the head is provided with a top surface having a square opening.

11. The screw of claim 4 wherein the thread pattern of the lower region is symmetrical.

12. The screw of claim 4 wherein the upper region has an inverted buttress thread configuration.

13. The screw of claim 4 wherein the tip is a gimlet tip having an included angle from about 20° to about 30°.

14. A screw for securing wood products, comprised of:
    a shaft and a head, wherein the head is provided with a top surface having an opening to receive a tool, a bottom surface, a crown that extends around the perimeter of the head and extends beyond the lower surface of the head thereby defining an open volume between the lower edge of the crown and the shaft of the screw;
    wherein the shaft is provided with a substantially cylindrical threaded upper region located proximate the head and a substantially cylindrical threaded lower region located near a distal end of the screw, the distal end having a tip and the number of threads per unit length in the upper region exceeds the number of threads per unit length in the lower region, said shaft having a cross-sectional area along the cylindrical upper region greater than the cross-sectional area of the shaft along the cylindrical lower region.

15. The screw of claim 14 wherein there are at least twice as many threads per unit length in the upper region as there are threads per unit length in the lower region.

16. The screw of claim 14 wherein the head is provided with a top surface having a square opening.

17. The screw of claim 14 wherein the thread pattern of the lower region is symmetrical.

18. The screw of claim 14 wherein the upper region has an inverted buttress thread configuration.

19. The screw of claim 14 wherein the tip is a gimlet tip having an included angle from about 20° to about 30°.

20. A screw for securing wood products, comprised of:
a shaft and a head, wherein the head is provided with a top surface having an opening to receive a tool, a bottom surface, a crown that extends around the perimeter of the head, wherein the crown extends beyond the lower surface of the head, forming a recessed region between the lower edge of the crown and the shaft of the screw;
wherein the shaft is provided with a substantially cylindrical threaded upper region located proximate the head and a substantially cylindrical threaded lower region located near a distal end of the screw, the distal end having a tip, and the number of threads per unit length in the upper region exceeds the number of threads per unit length in the lower region, said shaft having a cross-sectional area along the cylindrical upper region greater than the cross-sectional area of the shaft along the cylindrical lower region.

21. The screw of claim 20 wherein there are at least twice as many threads per unit length in the upper region as there are threads per unit length in the lower region.

22. The screw of claim 20 wherein the head is provided with a top surface having a square opening.

23. The screw of claim 20 wherein the thread pattern of the lower region is symmetrical.

24. The screw of claim 20 wherein the upper region has an inverted buttress thread configuration.

25. The screw of claim 20 wherein the tip is a gimlet tip having an included angle from about 20° to about 30°.

26. A screw for securing wood products, comprised of:
a shaft and a head, wherein the head is provided with a top surface having an opening to receive a tool and a bottom surface having a v-shaped undercut;
wherein the shaft is provided with a substantially cylindrical threaded upper region located proximate the head and a substantially cylindrical threaded lower region located near a distal end of the screw, the distal end having a tip, and the number of threads per unit length in the upper region exceeds the number of threads per unit length in the lower region, said shaft having a cross-sectional area along the cylindrical upper region greater than the cross-sectional area of the shaft along the cylindrical lower region.

27. The screw of claim 26 wherein the v-shaped undercut has a conical surface that connects the lip with a conical underside of the head.

28. The screw of claim 27 wherein the conical surface slants away from the lip toward the axis of the shaft at an angle of approximately 45°.

29. The screw of claim 26 wherein there are at least twice as many threads per unit length in the upper region as there are threads per unit length in the lower region.

30. The screw of claim 26 wherein the head is provided with a top surface having a square opening.

31. The screw of claim 26 wherein the thread pattern of the lower region is symmetrical.

32. The screw of claim 26 wherein the upper region has an inverted buttress thread configuration.

33. The screw of claim 26 wherein the tip is a gimlet tip having an included angle from about 20° to about 30°.

34. A screw for securing wood products, comprised of:
a shaft and a head, wherein the head is provided with a top surface having an opening to receive a tool;
wherein the shaft is provided with a substantially cylindrical threaded upper region located proximate the head and a substantially cylindrical threaded lower region located near a distal end of the screw, the distal end having a tip, wherein the cross-sectional area of the shaft along the cylindrical upper region is greater than the cross-sectional area of the shaft along the cylindrical lower region, the number of threads per unit length in the upper region are at least twice the number of threads per unit length in the lower region, and wherein the upper region has an inverted buttress thread configuration.

35. The screw of claim 34 wherein the head is provided with a bottom surface, a crown that extends around the perimeter of the head and extends beyond the lower surface of the head thereby defining an open volume between the lower edge of the crown and the shaft of the screw.

36. The screw of claim 35 wherein the tip is a gimlet tip having an included angle from about 20° to about 30°.

37. The screw of claim 34 wherein the head is provided with a bottom surface, a crown that extends around the perimeter of the head, wherein the crown extends beyond the lower surface of the head, forming a recessed region between the lower edge of the crown and the shaft of the screw.

38. The screw of claim 37 wherein the tip is a gimlet tip having an included angle from about 20° to about 30°.

39. The screw of claim 34 wherein the head is provided with a bottom surface having a v-shaped undercut.

40. The screw of claim 39 wherein the tip is a gimlet tip having an included angle from about 20° to about 30°.

41. The screw of claim 34 wherein the head is provided with a top surface having a square opening.

42. The screw of claim 41 wherein the tip is a gimlet tip having an included angle from about 20° to about 30°.

43. The screw of claim 34 wherein the thread pattern of the lower region is symmetrical.

44. The screw of claim 43 wherein the tip is a gimlet tip having an included angle from about 20° to about 30°.

45. The screw of claim 34 wherein the tip is a gimlet tip having an included angle from about 20° to about 30°.

* * * * *

UNITED STATES PATENT AND TRADEMARK OFFICE
CERTIFICATE OF CORRECTION

| | |
|---|---|
| PATENT NO. | : 6,966,737 B2 |
| APPLICATION NO. | : 09/923288 |
| DATED | : November 22, 2005 |
| INVENTOR(S) | : McGovern et al. |

Page 1 of 1

It is certified that error appears in the above-identified patent and that said Letters Patent is hereby corrected as shown below:

Column 5:

Line 62, delete both recitations of "about".

Column 5:

Line 64, delete "Threads" and substitute --threads--.

Signed and Sealed this

Twenty-first Day of November, 2006

JON W. DUDAS
*Director of the United States Patent and Trademark Office*